United States Patent Office 2,844,593
Patented July 22, 1958

2,844,593
CYCLIC ACETALS

Edward F. Riener, Haddonfield, N. J., and W E Craig and Thomas J. Durkin, Philadelphia, Pa., assignors to Rohm & Haas Company, Philadelphia, Pa., a corporation of Delaware No Drawing. Application December 27, 1954
Serial No. 477,938

5 Claims. (Cl. 260—340.7)

This invention concerns cyclic acetals of the structure

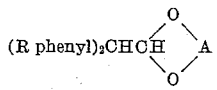

where A is an alkylene chain having two to three carbon atoms between the indicated ether oxygen atoms and containing a total of not over 12 carbon atoms, and R is hydrogen, chlorine, bromine, or fluorine.

This invention also deals with a process for preparing these compounds by reacting a 2,2-diphenylvinyl halide and a glycol having two to three carbon atoms between the hydroxyl groups thereof in the presence of an alkaline reagent at a reacting temperature between 150° and 250° C. and continuing reacting until the halogen of the diphenylvinyl halide is substantially displaced. The product is usually separated by taking up the reaction mixture in water. If the product is a solid, it can be filtered off and recrystallized, if desired. Whether solid or liquid, the product can be taken up in an inert, volatile organic solvent which is immiscible with water, such as benzene, toluene, xylene, ethylene dichloride, or the like. The extract is then separated, washed, and distilled, if so desired.

As alkaline reagents, there may be used sodium carbonate, sodium bicarbonate, sodium cyanide, potassium carbonate, potassium bicarbonate, sodium sesquicarbonate, sodium metasilicate, or other mild alkali, when the reaction is carried out above 180° C. When the reaction is to be performed above 150° and below about 220° C., potassium or sodium hydroxide may be used. The strong alkalies are best used between 150° and 220° C., as yields may fall off as higher temperatures are utilized.

As glycols there may be used any 1,2- or 1,3-glycol, including ethylene glycol, propylene glycol, trimethylene glycol, 1,2-, 2,3- or 1,3-butylene glycol, 1,2-hexanediol, 1,3-hexanediol, 2-ethyl-1,3-hexanediol, 2-isopropyl-5-methyl-1,3-hexanediol, 1,2-octanediol, 2-butyl-1,3-octanediol, 2-methyl-1,3-octanediol, 2,4-octanediol, α-methyl glyceryl ether, α-allyl glyceryl ether, α-octyl glyceryl ether, α-phenyl glyceryl ether, 2,2-di(chlorophenyl)-1,3-trimethylene glycol, phenylethylene glycol, or, in brief, any 1,2- or 1,3-glycol having substituents which are inert in the presence of the alkaline reagent. The glycol is desirably used in excess, serving as a reactant and as a flux.

The diphenylvinyl halides used for reaction with these glycols include 2,2-diphenylvinyl chloride or bromide, 2,2-bis(4-chlorophenyl)vinyl chloride or bromide, 2,2-bis(2-chlorophenyl)-vinyl chloride, 2,2-bis(2-methyl-4-chlorophenyl)vinyl chloride, 2,2-bis(bromophenyl)vinyl chloride, 2,2-bis(fluorophenyl)vinyl chloride, or 2,2-bis-(dichlorophenyl)vinyl chloride. These compounds are summarized by the general expression (R phenyl)$_2$C=CHX where X is chlorine or bromine and R is defined above.

As is known, the diphenylvinyl halides are prepared by dehydrohalogenating corresponding diphenyldihaloethanes, (R phenyl)$_2$CHCHX$_2$. Dehydrohalogenation is conveniently accomplished by heating a diphenyldichloroethane with an aqueous alkali metal hydroxide in a low boiling inert polar organic solvent, such as methanol or isopropyl alcohol. With these alcohols temperatures of 60° to 80° C. are used. Somewhat higher temperatures can be reached without resort to super-atmospheric pressure by utilizing tert-butanol. Substantially complete dehydrohalogenation is accomplished in a relatively short time. Yields of the diphenylvinyl halides are usually well above 90%, even after purification. Conversions appear to be above 95% as the diphenylvinyl halides are relatively stable compounds.

As 1,1-diphenyl-2,2-dichloroethanes there may be used 1,1 - diphenyl - 2,2 - dichloroethane, 1,1 - bis(4 - chlorophenyl) - 2,2 - dichloroethane, 1,1 - bis(4 - fluorophenyl) - 2,2 - dichloroethane, 1,1 - bis(bromophenyl) - 2,2 - dichloroethane, 1,1 - bis(methylchlorophenyl) - 2,2-dichloroethane, or 1,1-bis(2,4-dichlorophenyl)-2,2-dichloroethane, all by way of example. Comparable dibromoethanes can be used with like effects. Any of these compounds can first be converted to a diphenylvinyl halide which is isolated and then reacted or with allowance for consumption of alkaline reagent it can be so converted and without a step of isolating reacted with a defined glycol.

To illustrate a typical procedure for preparing the diphenylvinyl halides there is cited the following example. A solution is prepared from 230 parts of 1,1-bis(4-chlorophenyl)-2,2-dichloroethane and 134 parts of tert-butyl alcohol by stirring and warming the mixture. Thereto is added an aqueous 50% sodium hydroxide solution in an amount of 80 parts. The resulting reaction mixture is stirred and heated under reflux for about four hours. When heating is discontinued, the mixture is stirred with 120 parts of water. Layers are then allowed to form, the aqueous layer being drawn off and discarded. The organic layer is heated under reduced pressure with distillation of butyl alcohol. The resulting residue is taken up in 190 parts of methanol and 45 parts of acetone. The solution thus formed is chilled below 5° C. with formation of a solid phase, which is filtered off and dried at 40°–50° C. for 12 hours. The yield is 150 parts of 2,2-bis(chlorophenyl)-vinyl chloride. By the same procedure other diphenylvinyl halides may be prepared having as phenyl substituents fluorine, chlorine, or bromine, or mixed groups.

This invention is illustrated by the following typical examples wherein parts are by weight.

Example 1

There are mixed 64 parts of 1,1-bis(4-chlorophenyl)-2,2-dichloroethane, 69 parts of potassium carbonate, and 111 parts of ethylene glycol. This mixture is stirred and heated at 190°–198° C. for 16 hours. The reaction mixture is poured into ice water and the resulting mixture is well stirred. Crystalline material separates and is removed and crystallized from methanol as a white solid, melting at 93°–94° C. By analysis it contains 62.44% of carbon, 4.71% of hydrogen, and 22.93% of chlorine. It thus agrees with the composition of 2-(4,4'-dichlorobenzhydryl)-1,3-dioxolane, corresponding theoretical values for which are 62.18%, 4.53%, and 22.93% respectively. The product shows a molecular weight by an ebullioscopic method of 307±3 (theory 309).

In the same way there may be reacted any of the above defined diphenyldichloroethanes, potassium carbonate or other alkaline reagent, and ethylene glycol.

In each case there is obtained a product corresponding to the general formula

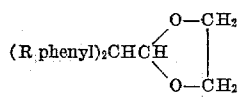

There may be used other glycols than ethylene glycol. For example, propylene glycol reacts to give 4-methyldioxolanes, while 1,2-hexanediol gives 4-butyldioxolanes. Similarly, 1,3-glycols yield 1,3-dioxanes.

*Example 2*

A mixture of 32.0 parts (0.1 mole) of 2,2-bis(4-chlorophenyl)-1,1-dichloroethane (M. P. 107–108° C.), 200 parts of 2,3-butanediol, and 69 parts (0.5 mole) of anhydrous potassium carbonate was stirred and heated. As the temperature approached the reflux temperature (185°–189° C.), volatile material (27 parts) was collected in a side receiver. The reflux temperature was maintained at 185°–189° C. for 17 hours. The reaction mass was then poured into ice water. The oil which separated was extracted with benzene. The benzene solution was washed with water and concentrated on a steam bath under water vacuum. The oil (31 parts) was distilled twice to yield 9.5 parts distilling at 179°–186° C./0.5 mm. It contained by analysis 21.9% of chlorine and corresponded in composition to 2-(4,4'-dichlorobenzhydryl)-4,5-dimethyl-1,3-dioxolane, for which the theoretical chlorine content is 21.0%.

*Example 3*

Ethylene glycol (280 parts), 2,2-bis(4-bromophenyl)-1,1-dichloroethane (204.4 parts), and potassium carbonate (69.5 parts) were mixed in a reaction vessel equipped with a stirrer, thermometer, condenser, water separator, and heating mantle. The mixture was heated to reflux; about 10 parts of low boiling material was removed in the water separator, and then the mixture was refluxed at 190°–200° C. for 36 hours. The reaction mixture was poured into 2500 parts of water. An oil separated which slowly crystallized. This was collected by filtration and air dried in a yield of 210 parts. Upon recrystallization from methanol there was obtained 128.5 parts of 2-(4,4'-dibromobenzhydryl)-1,3-dioxolane, melting at 101–102° C.

A sample was recrystallized to constant melting point (112°–112.7° C.) and then found to contain by analysis 48.46% of carbon, 3.53% of hydrogen, and 40.00% of bromine (theory 48.25%, 3.54%, and 40.10% respectively). This product has the structure

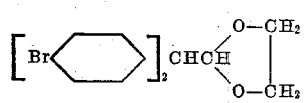

In the same way 2-(fluorobenzhydryl)-1,3-dioxolane is formed by starting with 2,2-bis(fluorophenyl)-1,1-dichloroethane.

*Example 4*

A mixture of 64 parts (0.2 mole) of 2,2-bis(4-chlorophenyl)-1,1-dichloroethane (M. P. 108°–109° C.), 100 parts of trimethylene glycol, and 69 parts (0.5 mole) of anhydrous potassium carbonate was stirred and heated to reflux 200°–205° C. for 4½ hours. The side tube attachment contained 7 parts of liquid before this temperature was reached. The reaction mass was poured into ice water and stirred well. A crystalline solid which separated was removed by filtration. After two crystallizations from methanol, 17.0 parts of a white crystalline solid was obtained which melted at 125°–126° C. It contained by analysis 21.5% of chlorine and was 2-(4,4'-dichlorobenzhydryl)-1,3-dioxane for which the theoretical chlorine content is 21.5%.

*Example 5*

Essentially the same procedure as above was repeated using 64 parts (0.2 mole) of 2,2-bis(4-chlorophenyl)-1,1-dichloroethane (M. P. 108°–109° C.), 69 parts (0.5 mole) of anhydrous potassium carbonate, and 100 parts of 2-ethyl-1,3-hexanediol. This produced about 27 parts of a white crystalline solid, melting at 95°–96° C. and containing 17.8% of chlorine (theory 18.05%) and was 2-(4,4'-dichlorbenzhydryl)-4-n-propyl-5-ethyldioxane-1,3.

*Example 6*

There are mixed 107.3 parts of 2,2-di(phenyl)vinyl chloride, 112 parts of potassium hydroxide, and 250 parts of ethylene glycol. The mixture is heated at 195° C.–208° C. for 18 hours, while 30 parts of low boiling materials are collected in a water-separator to achieve this temperature. The reaction mixture is poured into 1000 parts of water. An oil separates and some crystals form. These are collected by filtration, yielding 6 parts of stilbene.

The oil is extracted with benzene. This solution is dried over magnesium sulfate and concentrated. The residual oil (57 parts) is distilled. The fraction (10 parts) distilling at 125°–135° C./0.35 mm. is the desired product, 2-benzhydryl-1,3-dioxolane. This solidifies and can be recrystallized from methylcyclohexane, yielding 5 parts of pure 2-benzhydryl-1,3-dioxolane, melting at 80.5°–81° C. This purified sample contains by analysis 80.0% of carbon and 6.62% of hydrogen (theory 80.0% of carbon and 6.71% of hydrogen).

The glycol may be derived from a polyhydric alcohol with more than two hydroxyl groups, the additional hydroxyl groups being etherified, for example, to render them inactive.

*Example 7*

There are mixed 132 parts of α-allyl glyceryl ether, 128 parts of 1,1-bis(4-chlorophenyl)-2,2-dichloroethane (this lot of material melting at 108°–109° C.), and 69 parts of dry potassium carbonate. The mixture is stirred and heated at 172°–207° C. for 15 hours, low boiling distillate being removed by a trap. The reaction mixture is poured into ice water. This mixture is extracted with ethylene dichloride. The resulting solution is concentrated under reduced pressure on a steam bath to give a residual oil. This is twice distilled at low pressure. The fraction obtained at 220°–229° C./1.8 mm. corresponds in composition to 2-(4,4'-dichlorobenzhydryl) - 4 - allyloxymethyl - 1,3 - dioxolane. It contains by analysis 18.7% of chlorine (theory 18.7%) and has a bromine number of 44 (theory 42).

The identical product is obtained by starting with 2,2-bis(4 - chlorophenyl)vinyl chloride in an equivalent amount and following the above procedure.

This compound is a useful agent for controlling mites on plants.

The cyclic acetals of this invention are useful as pesticidal agents. For this purpose they may be formulated for use in sprays or in dusts. While these acetals may be dissolved in an organic solvent miscible with water and the resulting solution extended with water to give a dispersion of the acetal, it is usually better to use these compounds in the form of emulsifiable concentrates or in solid carriers.

An emulsifiable concentrate can be made by dissolving 25 parts of a given compound in 71 parts of an organic solvent to which four parts of an emulsifier are added. As solvent there may be used an aromatic naphtha, xylene, or the like. Advantageous emulsifiers include such non-ionic agents as alkylphenoxypolyethoxyethanols, methylene bis(diamylphenoxypolyethoxyethanols), oleic acid-polyglycerol condensates, etc.

Wettable powders are prepared by taking up 20 to 25 parts of a cyclic acetal in about 71 parts of a finely particled solid, such as a clay, and incorporating 2–3% of a dispersing agent such as the sodium salt of condensed naphthalene-formaldehyde condensates, and of a wetting agent such as one of the above non-ionic agents or sodium dodecyl sulfate or sodium octylphenoxyethoxyethylsulfonate.

Similar admixtures with smaller amounts of dispersing and/or wetting agent or even without these agents can be prepared for use as dusts. The usual level of these acetals in dusts is from 3% to 10%.

The pesticidal action of the acetals was evaluated by standard tests. Against bean beetle larvae 2,2-bis(4-chlorophenyl)-1,3-dioxane gave a 70% kill when applied in a wettable powder at 8 lbs. per 100 gallons of spray. When a spray containing 2,2-bis(4-chlorophenyl)-4-propyl-5-ethyl-1,3-dioxane at a dilution of 1:400 from an emulsifiable concentrate was applied to red spiders on plants a kill of 75% was found at 24 hours. The compound 2,2-bis(4-chlorophenyl)-1,3-dioxolane gave an 89% kill at 24 hours of red spiders on bean plants when used from an emulsifiable concentrate in a spray at 1:400. It gave a kill at 24 hours of 100% of bean beetle larvae when applied in a spray formed with a wettable powder, this compound being used at 2 lb./100 gallons.

The compound 2,2-bis(4-chlorophenyl)-4,5-dimethyl-1,3-dioxolane gave a 100% kill at a 1:400 dilution when used from an emulsifiable concentrate.

Other dioxanes and dioxolanes of this invention are likewise active as pesticides. They are also useful as chemical intermediates, yielding, for example, diphenylacetaldehydes.

We claim:
1. A process for preparing cyclic acetals of the formula

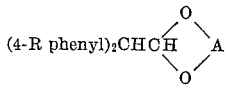

which comprises reacting a compound of the formula (4-R phenyl)$_2$C=CHCl an alkaline catalyst, and a glycol of the formula

HOAOH at a reacting temperature between 150° and 250° C., R being a member of the class consisting of hydrogen, fluorine, chlorine, and bromine, and A being an alkylene chain having two to three carbon atoms between the indicated oxygen atoms and containing a total of not over 12 carbon atoms.

2. A process for preparing cyclic acetals of the structure

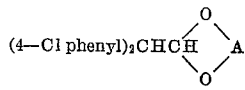

which comprises reacting the compound (4-Cl phenyl)CH=CHCl an alkaline catalyst, and a glycol of the formula

HOAOH at a reacting temperature between 150° and 250° C., A being an alkylene chain having two to three carbon atoms between the indicated oxygen atoms and containing a total of not over 12 carbon atoms.

3. A process for preparing

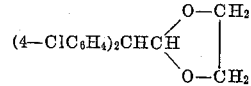

which comprises reacting 2,2-bis(4-chlorophenyl)vinyl chloride, an alkaline catalyst, and ethylene glycol at a reacting temperature between 150° and 250° C.

4. A process for preparing

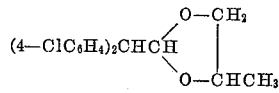

which comprises reacting 2,2-bis(4-chlorophenyl)vinyl chloride, an alkaline catalyst, and propylene glycol at a reacting temperature between 150° and 250° C.

5. A process for preparing

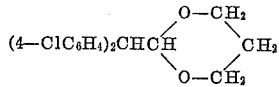

which comprises reacting 2,2-bis(4-chlorophenyl)vinyl chloride, an alkaline catalyst, and trimethylene glycol at a reacting temperature between 150° and 250° C.

References Cited in the file of this patent

UNITED STATES PATENTS

| | | |
|---|---|---|
| 1,837,273 | Knorr | Dec. 22, 1931 |
| 2,296,375 | Arundale | Sept. 22, 1942 |
| 2,385,661 | Vaala et al. | Sept. 25, 1945 |
| 2,588,407 | Newman | Mar. 11, 1952 |

FOREIGN PATENTS

| | | |
|---|---|---|
| 149,610 | Switzerland | Nov. 16, 1931 |

OTHER REFERENCES

Salmi et al.: Chem. Abst., vol. 42, page 537 (1948).
Nixon et al.: J. A. S. C., vol. 58, pages 492–98 (1936).
Sulzbacker: J. A. C. S., vol. 70, pp 2827–8 (1948).